United States Patent
Lin et al.

(10) Patent No.: US 12,306,686 B2
(45) Date of Patent: May 20, 2025

(54) THERMAL PROTECTION OF COMPUTER PERIPHERAL CABLES

(71) Applicant: Hewlett-Packard Development Company, L.P., Spring, TX (US)

(72) Inventors: Wen-Bin Lin, Taipei (TW); Chao-Wen Cheng, Taipei (TW); Cheng-Yi Yang, Taipei (TW); Chien-Wei Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 205 days.

(21) Appl. No.: 18/341,665

(22) Filed: Jun. 26, 2023

(65) Prior Publication Data
US 2024/0427399 A1 Dec. 26, 2024

(51) Int. Cl.
| | | |
|---|---|---|
| *G06F 1/28* | (2006.01) | |
| *G06F 1/26* | (2006.01) | |
| *H02H 5/04* | (2006.01) | |

(52) U.S. Cl.
CPC ............... *G06F 1/28* (2013.01); *G06F 1/266* (2013.01); *H02H 5/042* (2013.01)

(58) Field of Classification Search
None
See application file for complete search history.

(56) References Cited

U.S. PATENT DOCUMENTS

| | | | | |
|---|---|---|---|---|
| 10,084,266 | B1* | 9/2018 | Tsao | B60L 53/18 |
| 10,162,404 | B2* | 12/2018 | Miyaoka | G06F 1/26 |
| 2009/0164687 | A1* | 6/2009 | Zhu | G06F 1/325 |
| | | | | 710/302 |
| 2009/0172236 | A1* | 7/2009 | Sun | G06F 1/26 |
| | | | | 710/302 |
| 2010/0293394 | A1* | 11/2010 | Rui | G06F 1/3218 |
| | | | | 713/300 |
| 2011/0252249 | A1* | 10/2011 | Wang | G06F 1/26 |
| | | | | 713/300 |
| 2014/0036443 | A1* | 2/2014 | Xu | H05K 7/20209 |
| | | | | 165/247 |
| 2016/0241406 | A1* | 8/2016 | Darshan | H04L 12/10 |
| 2024/0047927 | A1* | 2/2024 | Huang | H01R 24/28 |

* cited by examiner

*Primary Examiner* — Danny Chan
(74) *Attorney, Agent, or Firm* — Knobbe, Martens, Olson & Bear, LLP

(57) ABSTRACT

The disclosed technology is directed to a computing device for detecting and preventing melting of a component of the computing device. In some examples, the computing device includes a cable that connects a power supply unit and an add-on card, and a thermal protection controller. Based on a sensor signal from a temperature sensor of the cable, the thermal protection controller determines that a temperature associated with the cable exceeds a threshold temperature. Responsive to determining that the temperature associated with the cable exceeds the threshold temperature, the thermal protection controller causes the power supply unit to cease supplying power to the add-on card by transmitting an overtemperature signal through the cable.

20 Claims, 6 Drawing Sheets

THERMAL PROTECTION OF COMPUTER PERIPHERAL CABLES

BACKGROUND

Discrete graphics cards have become prevalent in computing systems. Many newer graphics cards have relatively high levels of power utilization that can generate significant heat. In computing systems with poor airflow or located in poorly ventilated environments, the heat within the computing system can reach levels above manufacturer specifications.

SUMMARY

The systems, methods and devices of this disclosure each have several innovative embodiments, no single one of which is solely responsible for all of the desirable attributes disclosed herein. Details of one or more implementations of the subject matter described in this specification are set forth in the accompanying drawings and the description below.

In some embodiments, the techniques described herein relate to a computing system including: a cable including: a first wire to electrically connect a ground pin of a power supply unit to a ground pin of a graphics card; a second wire to electrically connect a power stability pin of the power supply unit to a power stability pin of the graphics card; and a temperature sensor including a first end and a second end, wherein the first end of the temperature sensor is electrically connected to the first wire; and a thermal protection controller including an input terminal and an output terminal, wherein the input terminal is electrically connected to the second end of the temperature sensor, and wherein the output terminal is electrically connected to the second wire, the thermal protection controller to: determine, based on a voltage of the input terminal, that a temperature associated with the cable exceeds a threshold temperature; and responsive to determining that the temperature associated with the cable exceeds the threshold temperature, cause the power supply unit to cease supplying power to the graphics card.

In some embodiments, the techniques described herein relate to a computing system, wherein, responsive to determining that the temperature associated with the cable exceeds the threshold temperature, the thermal protection controller drives a voltage of the second wire through the output terminal from a first voltage to a second voltage to cause the power supply unit to cease supplying power to the graphics card.

In some embodiments, the techniques described herein relate to a computing system, wherein the cable further includes a third wire, and wherein the input terminal is electrically connected to the second end of the temperature sensor through the third wire of the cable.

In some embodiments, the techniques described herein relate to a computing system, wherein the cable further includes a fourth wire, and wherein the output terminal is electrically connected to the second wire through the fourth wire of the cable.

In some embodiments, the techniques described herein relate to a computing system, wherein the temperature sensor includes a thermal resistor.

In some embodiments, the techniques described herein relate to a computing system, wherein, responsive to determining that the temperature associated with the cable exceeds the threshold temperature, the thermal protection controller is to cause an alert to be output.

In some embodiments, the techniques described herein relate to a cable including: a first wire to electrically connect a ground pin of a power supply unit to a ground pin of a graphics card; a second wire to electrically connect a power stability pin of the power supply unit to a power stability pin of the graphics card; a cable connector to: connect the first wire to the ground pin of the graphics card; connect the second wire to the power stability pin of the graphics card; and house a temperature sensor; the temperature sensor including a first end and a second end, wherein the first end of the temperature sensor is electrically connected to the first wire; a third wire to electrically connect the second end of the temperature sensor to an input terminal of a thermal protection controller; and a fourth wire shorted to the second wire, the fourth wire to electrically connect to an output terminal of the thermal protection controller, wherein a temperature associated with the cable is determined based on a voltage of the input terminal that is electrically connected to the second end of the temperature sensor through the third wire, and wherein, responsive to the temperature associated with the cable being determined to exceed a threshold temperature, a voltage of the second wire is driven by the output terminal and the fourth wire from a first voltage to a second voltage to cause the power supply unit to cease supplying power to the graphics card.

In some embodiments, the techniques described herein relate to a cable, wherein the first end of the temperature sensor is electrically connected to the first wire through a first internal connection of the cable connector.

In some embodiments, the techniques described herein relate to a cable, wherein the fourth wire is shorted to the second wire through a second internal connection of the cable connector.

In some embodiments, the techniques described herein relate to a cable, wherein the temperature sensor includes a thermal resistor.

In some embodiments, the techniques described herein relate to a cable, wherein the threshold temperature is sixty-five degrees Celsius or more.

In some embodiments, the techniques described herein relate to a printed circuit assembly including: a host controller, the host controller communicatively connected with a thermal protection controller; and the thermal protection controller including a first terminal and a second terminal, wherein the first terminal is electrically connected to a first wire of a cable through a temperature sensor included in the cable, and wherein the second terminal is electrically connected to a second wire of the cable, the thermal protection controller to: receive, at the first terminal, a sensor signal from the temperature sensor; determine, based on the sensor signal, that a temperature associated with the cable exceeds a threshold temperature; and responsive to determining that the temperature associated with the cable exceeds the threshold temperature, trigger a thermal protection operation including causing a power supply unit to cease supplying power to a graphics card by transmitting an overtemperature signal from the second terminal to the power supply unit through the second wire of the cable.

In some embodiments, the techniques described herein relate to a printed circuit assembly, further including a fan subsystem communicatively connected with the thermal protection controller, wherein the thermal protection operation includes causing the fan subsystem to increase a fan speed or a duty cycle of a fan.

In some embodiments, the techniques described herein relate to a printed circuit assembly, wherein the thermal protection operation includes causing the host controller to trigger an output of an alert.

In some embodiments, the techniques described herein relate to a printed circuit assembly, wherein the first wire electrically connects a ground pin of the power supply unit to a ground pin of the graphics card, and wherein the second wire electrically connects a power stability pin of the power supply unit to a power stability pin of the graphics card.

In some embodiments, the techniques described herein relate to a printed circuit assembly, wherein a first end of the temperature sensor is electrically connected to the first wire of the cable, and wherein a second end of the temperature sensor is electrically connected to the first terminal.

In some embodiments, the techniques described herein relate to a printed circuit assembly, wherein the temperature sensor is a thermal resistor, and wherein the sensor signal is a voltage across the thermal resistor.

In some embodiments, the techniques described herein relate to a printed circuit assembly, wherein, to determine that the temperature associated with the cable exceeds the threshold temperature, the thermal protection controller is to: determine the voltage across the thermal resistor; and determine the temperature associated with the cable based on the voltage across the thermal resistor.

In some embodiments, the techniques described herein relate to a printed circuit assembly, wherein the second end of the temperature sensor is electrically connected to the first terminal through a third wire of the cable.

In some embodiments, the techniques described herein relate to a printed circuit assembly, wherein the second terminal is electrically connected to the second wire of the cable through a fourth wire of the cable.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

DETAILED DESCRIPTION

Figure 1:
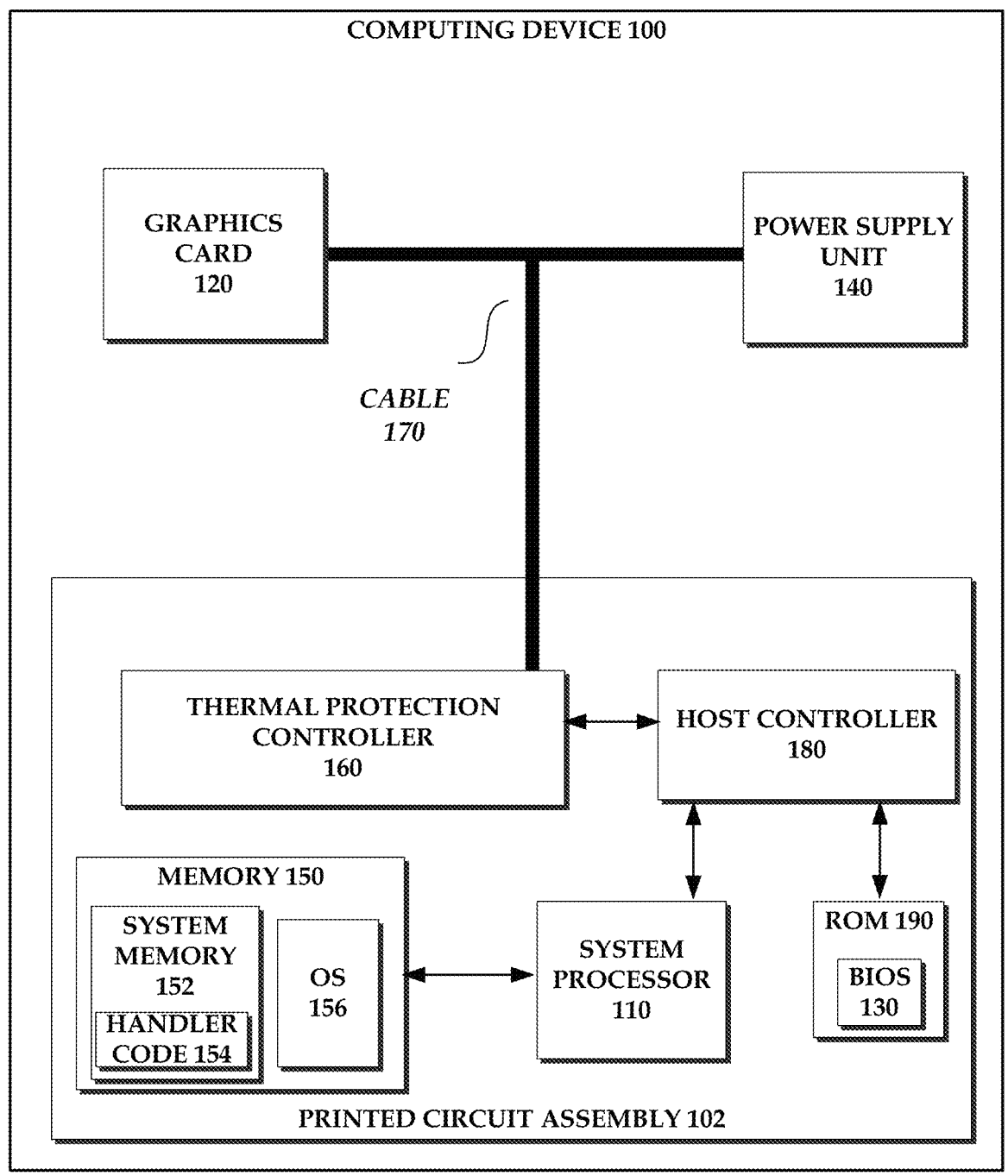
FIG. 1 illustrates a block diagram of an example computing device in which some examples of the present disclosure may be implemented.

The graphics processing unit (GPU) may be utilized for applications including graphics rendering, video rendering, artificial intelligence, autonomous vehicle control, and so forth. As GPUs become more advanced and more powerful, the graphics card hosting the GPU may consume ever greater amounts of power, which can consequently result in increased heat generation. For example, Generation 5 of the Peripheral Component Interconnect Express (PCIe 5.0) permits a GPU on a graphics card to draw up to 600 Watts from a power supply unit through a 12VHPWR connector, which may be a type of 12+4 pin power connector. If the thermal contribution of the GPU is not mitigated, temperature within the computing device may increase beyond a supported temperature limit of a component. Moreover, a cable (e.g., a power cable or device cable, which may include both data and power connections) may also be associated with supported temperature limits. When the temperature of the cable or an ambient temperature surrounding a cable exceeds a threshold, the cable may be damaged. For example, excessive temperatures may cause wires, a cable head, or other elements a cable to melt.

More specifically, connectors or wires of a cable compatible with the PCIe Card Electromechanical (CEM) 5.0 specification can operate under temperatures of up to 55° C. without having issues such as melting. However, there may be situations where temperatures associated with the cable may increase over a temperature limit beyond which parts of the cable may melt. For example, when the GPU utilization rate exceeds a threshold, the temperature associated with the cable may reach or even exceed 65° C. When above 65° C., the cable may not be thermally viable and at least parts of the cable may melt. When melting occurs, insulation around wires of the cable, a wire of the cable, or a cable head or connector of the cable may melt. In some cases, the melting may cause wires of the cable to be shorted together. In other cases, the melting may cause a wire to break resulting in an open circuit. In either situation, damage to the cable may result in damage to additional components within the computing system (e.g., a peripheral card like a graphics card that is connected to the cable).

Currently, there are not reliable ways to alert a user or to prevent melting associated with a cable connecting a graphics card or other peripheral card to a power supply unit. The Advanced Technology Extended (ATX) 3.0 specification and the PCIe CEM 5.0 define a power stability pin and a corresponding cable wire that can be utilized by a graphics card to notify a power supply unit about improper power supply voltage level (e.g., the power supply voltage received by the graphics card deviates from a predefined target range) through pulling down a voltage (e.g., from a high voltage to a low voltage) of the power stability pin. However, the voltage of the power stability pin may not be indicative of a temperature associated with the cable for alerting or preventing melting. Rather, the voltage of the power stability pin may be indicative of the stability of power provided by the power supply unit.

As such, it is desirable to implement an alerting and/or protection mechanism to prevent a cable or a power cable associated with delivering power between a graphics card and a power supply unit from melting or otherwise being damaged due to heat or high wattage. Some embodiments of the present disclosure include a system that can detect a temperature associated with a cable and that can trigger a thermal protection operation based on the detected temperature. In some examples, based on a voltage of an input terminal electrically connected to a temperature sensor through a wire of the cable, the thermal protection controller may determine that a temperature associated with the cable exceeds a threshold temperature. Responsive to determining that the temperature associated with the cable exceeds the threshold temperature, the thermal protection controller may trigger a thermal protection operation. The thermal protection operation may include causing the power supply unit to cease supplying power to the graphics card, causing a display of a warning message about potential occurrence of melting, and/or increasing a speed or duty cycle of a fan of a computing device.

In some examples, an output terminal of the thermal protection controller may be electrically connected to a power stability pin of a graphics card and a power stability pin of a power supply unit through a wire of the cable. Responsive to determining that the temperature associated with the cable exceeds the threshold temperature, the thermal protection controller may cause the power supply unit to cease supplying power to the graphics card. For example, the thermal protection controller may drive the output terminal to pull down a voltage of the power stability pin of the power supply unit to cause the power supply unit to cease supplying power to the graphics card. As such, the existing power stability pins and the corresponding cable wire may be utilized for thermal protection in addition to notifying deviation of power supply voltage.

Additionally, some embodiments of the present disclosure relate to a cable that connects a graphics card and a power supply unit, where the cable may assist a thermal protection controller in detecting, alerting, or preventing melting of the cable. In some examples, besides existing wires associated with a connector (e.g., the 12VHPWR connector), the cable may integrate a temperature sensor and two extra wires for providing, transmitting, and/or receiving signals processed by a thermal protection controller to detect temperature associated with the cable and prevent the cable from melting.

In some examples, some of the disclosed embodiments may be implemented in hardware, firmware, software, or any combination thereof. At least some of the disclosed embodiments may be implemented as instructions stored in a transitory or non-transitory computer-readable storage medium, which may be read and executed by a processor core or thread. Further, the instructions may be updated and/or obtained from a remote server via a network connection.

Example Computing Device

FIG. 1 illustrates a block diagram of an example computing device 100 in which examples of the present disclosure may be implemented. Examples of the computing device 100 may include, but not limited to, laptops, desktops, tablets, wearable computers, smartphones, personal digital assistants (PDA), hybrid PDA/mobile phones, set-top boxes, voice command devices, smartphones, and digital media players. In some examples, the computing device 100 includes a system processor 110, a read-only memory (ROM) 190 that stores a basic input/output system (BIOS) 130, a memory 150, a host controller 180, a thermal protection controller 160, a cable 170, a graphics card 120 and a power supply unit 140. As illustrated in FIG. 1, the thermal protection controller 160, the graphics card 120, and the power supply unit 140 are electrically connected with each other through the cable 170. Further, FIG. 1 illustrates an example situation where the system processor 110, the ROM 190, the memory 150, the host controller 180 and the thermal protection controller 160 are deployed on a printed circuit assembly 102 (e.g., a motherboard or mainboard) of the computing device 100, whereas the graphics card 120 and the power supply unit 140 are deployed outside the printed circuit assembly 102 of the computing device 100. It should be understood that other configurations of the computing device 100 are possible. For example, the graphics card 120 may be deployed on the printed circuit assembly 102.

In some examples, the system processor 110 may be embodied as any type of single-core, single-thread, multi-core, and/or multi-thread processor capable of performing functions as described herein. The system processor 110 may be embodied as a microprocessor, central processing unit (CPU), digital signal processor (DSP), microcontroller, or other processor or processing/controlling circuit. As illustrated in FIG. 1, the system processor 110 may communicate directly or indirectly with the ROM 190, the memory 150, the host controller 180 and/or the thermal protection controller 160. In some examples, the system processor 110 may directly communicate with the memory 150 to access data and instructions stored (e.g., the handler code 154) in the memory 150 to perform various functions, such as responding to system management interrupt.

In some examples, the host controller 180 may be embodied as circuitry or components to facilitate input/output operations with the system processor 110, the memory 150, the thermal protection controller 160, or other components of the computing device 100. For example, the host controller 180 may be implemented as, or otherwise include, platform controller hubs, input/output control hubs, firmware devices, communication links such as bus links and printed circuit board traces, and other components that can facilitate input/output operations associated with components, such as the peripherals of the computing device 100. In some examples, the host controller 180 may be a part of a system-on-a-chip and can be deployed along with the system processor 110 and other components of the computing device 100 on a single or multiple integrated circuits or chipsets. In some examples, the host controller 180 may be embodied as a Platform Controller Hub (PCH) or may implement the extensible Host Controller Interface (xHCI) specification and/or the Serial Peripheral Interface Bus (SPI) to facilitate communications between the thermal protection controller 160 and other components (e.g., the ROM 190) of the computing device 100.

In some examples, the memory 150 may be embodied as any type of volatile or non-volatile memory or data storage, such as dynamic random access memory (DRAM), static random access memory (SRAM), synchronous DRAM (SDRAM), or double data rate synchronous dynamic random access memory (DDR SDRAM). The memory 150 may store various data and program code used during operation of the computing device 100, including, for example, the operating system (OS) 156, application programs, libraries, driver, and the like. As mentioned above, the memory 150 may be communicatively coupled to the system processor 110.

In some examples, the memory 150 may include system memory 152 that is accessible by the system processor 110. In some cases, the system memory 152 may be accessible after or in response to the system processor 110 receiving or detecting a system management interrupt. The system memory 152 may be used to store sensitive or secure code (e.g., the handler code 154) not accessible by the system processor 110 unless the system processor 110 is in a system management mode (SMM), which may be triggered by the system management interrupt. In some examples, the system memory 152 may be a system management RAM (SM-RAM) and the handler code 154 in the system memory 152 may be instantiated by the BIOS 130 during bootup process of the computing device 100. The handler code 154 may include information (e.g., data and instructions) that, when executed by the system processor 110, allows the system processor 110 to handle or process the system management interrupt.

As used herein, a basic input/output system (BIOS) 130 refers to hardware or hardware and instructions to initialize, control, or operate a computing device prior to execution of an operating system (OS) of the computing device. Instructions included within a BIOS 130 may be software, firmware, microcode, or other programming that defines or controls functionality or operation of a BIOS 130. In one example, a BIOS 130 may be implemented using instructions, such as platform firmware of a computing device, executable by a processor. A BIOS 130 may operate or execute prior to the execution of the OS of a computing device. A BIOS 130 may initialize, control, or operate components such as hardware components of a computing device and may load or boot the OS of a computing device 100. In some examples, a BIOS 130 may provide or establish an interface between hardware devices or platform firmware of the computing device and an OS of the computing device 100, via which the OS of the computing device may control or operate hardware devices or platform firmware of the computing device 100. In some examples, a BIOS 130 may implement the Unified Extensible Firmware Interface (UEFI) specification or another specification or standard for initializing, controlling, or operating a computing device 100. The BIOS 130 may be stored by a memory, such as a read-only memory (ROM) 190, flash memory (not shown in FIG. 1), or other non-volatile memory.

In some examples, the graphics card 120 may include a graphics processing unit (GPU) (not shown). The GPU may be an integrated circuit device and can be utilized for applications such as image rendering. Further, the GPU may work in conjunction with the system processor 110 to perform tasks such as 3D video rendering. Although not shown in FIG. 1, the graphics card 120 may include a volatile memory (e.g., DDR memory) dedicated for the GPU and/or a non-volatile memory (e.g., solid-state drive) dedicated for the GPU. The graphics card 120 may further include interface circuitry (e.g., pins) (not shown) to enable communication between the power supply unit 140 and components (e.g., the system processor 110) on the printed circuit assembly 102.

Although illustrated to be outside the printed circuit assembly 102, the graphics card 120 may connect to the printed circuit assembly 102 through a slot (e.g., an AGP slot, a PCI-Express slot, etc.). In some examples, the printed circuit assembly 102 may be an ATX compliant computer system motherboard and the graphics card 120 may be compliant with the ATX form factor. It should be noted that, in other examples, the graphics card 120 may be any other add-on cards that can be plugged into the computing device 100 and receive power supply from the power supply unit 140.

In some examples, the power supply unit 140 may receive an alternating current (AC) power source and generate supply voltage(s) for one or more components (e.g., the graphics card 120 or components on the printed circuit assembly 102) of the computing device 100. The power supply unit 140 may be attached to a chassis (not shown) of the computing device 100. In some examples, the power supply unit 140 may be compatible with the ATX specification (e.g., the ATX 1.0, the ATX 2.0, or the ATX 3.0).

The power supply unit 140 may supply power to the graphics card 120 through the cable 170. In some examples, the cable 170 may be compatible with the PCIe 2.0, PCIe 3.0, PCIe 4.0 or PCIe 5.0 specification. In other examples, the cable 170 may be compatible with non-PCIe specifications. For example, the cable 170 may be compatible with the Serial Advanced Technology Attachment (SATA) specification. In still other examples, the cable 170 may be compatible with any other cable specification that can connect a power supply unit to a peripheral as long as the cable 170 and that can provide a signal to cease power being provided to a device upon detection of a temperature within the cable 170 exceeding a threshold.

In some examples, the cable 170 may include a connector (e.g., the 12VHPWR connector) for connecting to pins on the graphics card 120 to enable power delivery from the power supply unit 140 to the graphics card 120. In some examples, in addition to connecting the graphics card 120 and the power supply unit 140, the cable 170 may facilitate the thermal protection controller 160 to detect, alert, or prevent melting associated with the cable 170 through wires designated for use in detecting temperature and controlling the flow of power. In some examples, these wires may be additional or extra wires that are in addition to the wires used by the cable 170 to connect the power supply unit 140 to the graphics card 120 or other peripheral (not shown in FIG. 1) of the computing device 100. For example, these wires can be omitted while maintain operation of the graphics card 120 or other peripheral in cases where thermal protection is not desired. Detailed discussions about the cable 170 will be described with respect to FIG. 2 and FIG. 3.

Besides communicating with the power supply unit 140 through the PCIe interface, in some examples, the graphics card 120 may include circuitry and ports supporting other communication protocols/interfaces with other components of the computing device 100. For example, the graphics card 120 may include other types of connectors/ports including universal serial bus (USB) ports, thunderbolt ports, High-Definition Multimedia Interface (HDMI) ports, or DisplayPort connectors, or the like to enable connectivity with other components (e.g., a display) associated with the computing device 100.

As illustrated in FIG. 1, the graphics card 120, the power supply unit 140 and the thermal protection controller 160 may be communicatively coupled with each other through the cable 170. During the operation of the GPU on the graphics card 120, the thermal protection controller 160 may detect a temperature associated with the cable 170 based on a sensor signal received from a wire of the cable 170 for triggering a thermal protection operation. In some examples, the thermal protection controller 160 may determine that a temperature associated with the cable 170 exceeds a threshold temperature (e.g., 60° C., 65° C. or other temperature). The threshold temperature may be manufacturer-dependent or may be based on supported specifications by the cable 170. Thus, the threshold temperature for some implementations of the cable 170 may by 55° C. while the threshold temperature for other implementations of the cable 170 may by 69° C. or more, or anything in between the aforementioned examples. Responsive to determining that the temperature associated with the cable 170 exceeds the threshold temperature, the thermal protection controller 160 may trigger a thermal protection operation. Some non-limiting examples of the thermal protection operation may include causing the power supply unit 140 to cease supplying power to the graphics card 120 through the cable 170, causing a display of warning message about potential occurrence of melting, or increasing speed or duty cycle of a fan of the computing device 100.

Figure 2:
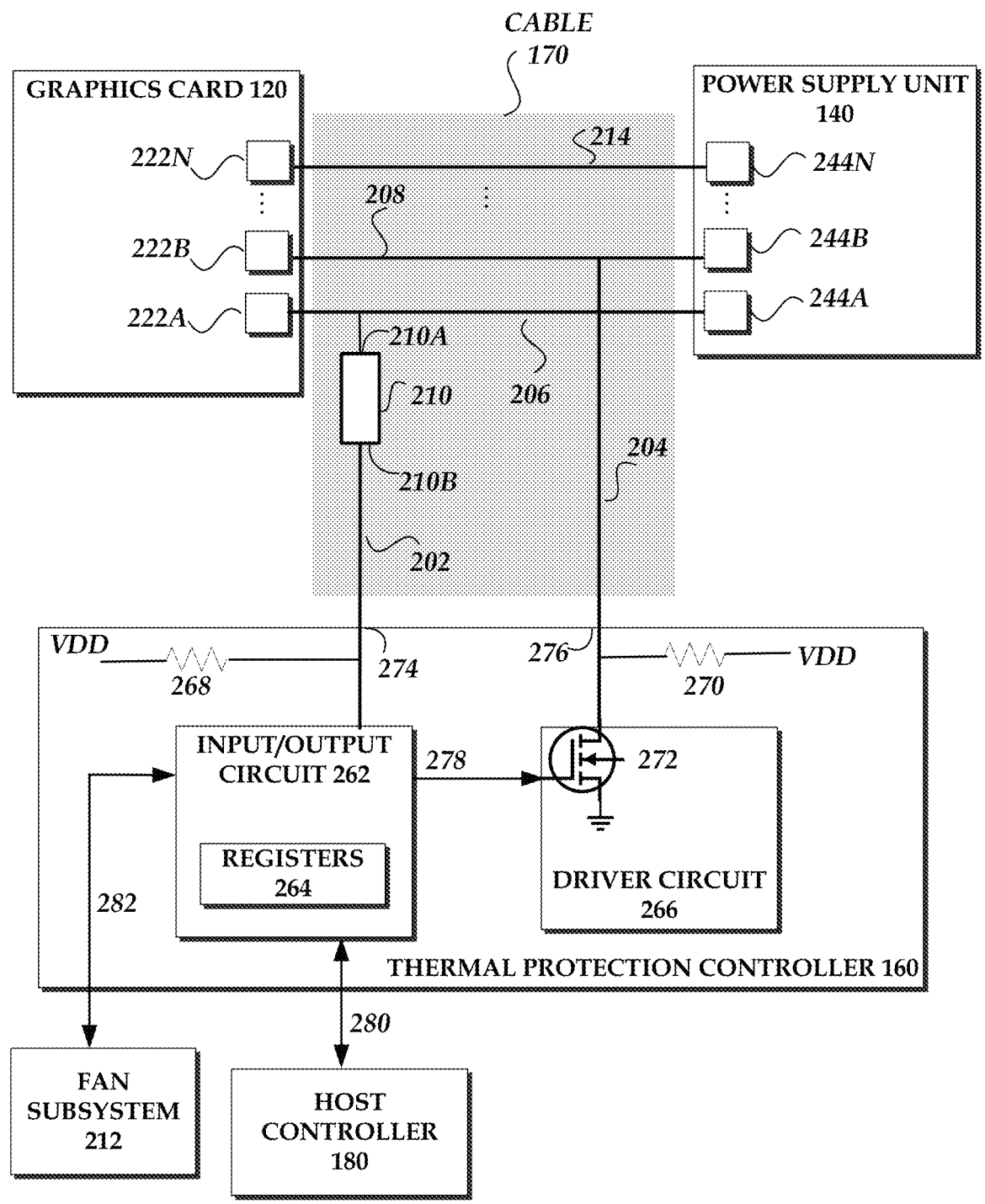
FIG. 2 illustrates a block diagram with additional details of some components of the computing device of FIG. 1 and with which melting of a cable may be alerted or prevented in accordance with some examples of the present disclosure.

In some examples, as in FIG. 2, an output terminal of the thermal protection controller 160 may be electrically connected to a wire of the cable 170 that electrically connects a power stability pin of the graphics card 120 and a power stability pin of the power supply unit 140. Responsive to determining that the temperature associated with the cable 170 exceeds the threshold temperature, the thermal protection controller 160 may cause the power supply unit 140 to cease supplying power to the graphics card 120. In some examples, the thermal protection controller 160 may drive the output terminal from a high voltage to a low voltage to cause a voltage of the other wire of the cable 170 to be driven to the low voltage. Upon detecting the voltage of the other wire of the cable 170 be driven to the low voltage through the power stability pin of the power supply units 140, the power supply unit 140 may cease supplying power to the graphics card 120.

In some examples, responsive to determining that the temperature associated with the cable 170 exceeds a threshold temperature, the thermal protection controller 160 may cause output of an alert or a warning message. The warning or alert may indicate occurrence of or a risk of occurrence of damage (e.g., melting) to the cable 170. The generation of the alert may be triggered in response to receipt of an alert signal by the host controller 180. Further, the alert signal may cause triggering of a system management interrupt (SMI). Upon receiving the interrupt message from the host controller 180, the operating system (OS) 156 may cause an alert indicating risk of melting at the cable 170 to be generated. This alert may be output on a display of the computing device 100. In other examples, responsive to determining that the temperature associated with the cable 170 exceeds a threshold temperature, the thermal protection controller 160 may cause a speed or duty cycle of a fan of the computing device 100 to increase.

Example Melting Reporting and Prevention Blocks

FIG. 2 illustrates an example block diagram of a thermal protection controller 160, a cable 170 that includes at least a first wire 206, a second wire 208, a third wire 202, a fourth wire 204 and a temperature sensor 210, the graphics card 120, the power supply unit 140, and other components (e.g., the host controller 180 and the fan subsystem 212) of the computing device 100 that can coordinate with each other to detect, alert or prevent melting at the cable 170 in accordance with some examples of the present disclosure.

As illustrated in FIG. 2, each of the graphics card 120 and the power supply unit 140 may include N pins (e.g., 222A through 222N or 244A through 244N), where N may be any positive integer equal or greater than two. In some examples, one of the pins (e.g., 222N) of the graphics card 120 may be connected with one of the pins (e.g., 244N) of the power supply unit 140 through one of the wires (e.g., 214) of the cable 170. It should be noted that the number of pins of the graphics card 120 and the power supply unit 140 can be different from each other.

As shown in FIG. 2, the graphics card 120 may include the ground pin 222A and the power supply unit 140 may include the ground pin 244A. The ground pin 222A of the graphics card 120 may be connected with the ground pin 244A of the power supply unit 140 through the first wire 206 of the cable 170. In some examples, the ground pin 222A, the ground pin 244A and the first wire 206 may be biased at a ground voltage or provide a reference voltage.

Additionally, the graphics card 120 may include the power stability pin 222B and the power supply unit 140 may include the power stability pin 244B. The power stability pin 222B of the graphics card 120 may be connected with the power stability pin 244B of the power supply unit 140 through the second wire 208 of the cable 170.

Besides the wires (e.g., 206, 208 and 214) that connect pins of the graphics card 120 and the pins of the power supply unit 140, the cable 170 may further include a temperature sensor 210, a third wire 202, and a fourth wire 204. The temperature sensor 210 may be any components that can sense a temperature associated with the cable 170 and generate a sensor signal that is indicative of the temperature associated with the cable 170. In some examples, the temperature sensor 210 may be a thermal resistor, a thermistor or a thermal sensitive resistor having a resistance that varies based on the temperature of the cable 170. For example, the resistance of the temperature sensor 210 may increase proportionally to the increase of the temperature associated with the cable 170.

As shown in FIG. 2, the temperature sensor 210 may have a first end 210A and a second end 210B. The first end 210A may be connected with the first wire 206 of the cable 170, and the second end 210B may be connected with the third wire 202 of the cable 170. Through the third wire 202, the temperature sensor 210 may be electrically connected to an input terminal 274 of the thermal protection controller 160. Further, through the fourth wire 204, an output terminal 276 of the thermal protection controller 160 may be electrically connected to the second wire 208.

Besides the input terminal 274 and the output terminal 276, the thermal protection controller 160 may include the input/output circuit 262 and the driver circuit 266 that can work in conjunction with each other to determine a temperature associated with the cable 170 and trigger a thermal protection operation. The input/output circuit 262 may be any circuitry that can receive and process a sensor signal from the temperature sensor 210 to determine a temperature associated with the cable 170. In some examples, the input/output circuit 262 and/or the driver circuit 266 may be implemented as a part of a system-on-a-chip and can be deployed along with the host controller 180 or other components (e.g., the system processor 110) of the computing device 100 on a single or multiple integrated circuits. The input/output circuit 262 may include registers 264 for storing data or information that may be utilized for determining the temperature associated with the cable 170.

The driver circuit 266 may be any circuitry that can transmit an overtemperature signal through the output terminal 276 or drive the output terminal 276 of the thermal protection controller 160 toward a desired voltage. In some examples, the driver circuit 266 may include a N-channel metal-oxide semiconductor (NMOS) 272, where a drain of the NMOS 272 may be connected with the output terminal 276 of the thermal protection controller 160 and a gate of the NMOS 272 may be connected with a port 278 of the input/output circuit 262.

In some examples, the fan subsystem 212 may be embodied as circuitry or components to control and manage one or more fans (not shown in FIG. 2) of the computing device 100. For example, the fan subsystem 212 may be embodied as, or otherwise include, hardware circuitry, driver, firmware devices, and other components that can control or manage one or more fans (e.g., a system fan or a processor fan) of the computing device 100.

During operation, the temperature sensor 210 may generate a sensor signal indicative of a temperature associated with the cable 170. The sensor signal may be received by the thermal protection controller 160 through the third wire 202 and an input terminal 274 of the thermal protection controller 160 for determining the temperature of the cable 170.

In some examples, the temperature sensor 210 may be a thermal resistor, a thermistor or a temperature sensitive resistor. The sensor signal may be a voltage across the temperature sensor 210. For example, when temperature associated with the cable 170 increases, a resistance of the temperature sensor 210 may also increase. Based on the voltage divider formed by the resistor 268 and the temperature sensor 210 with the resistor 268 connected to a power supply voltage VDD, the voltage across the temperature sensor 210 may change and may be received at the input terminal 274 of thermal protection controller 160. Upon receiving the voltage across the temperature sensor 210, the input/output circuit 262 may measure and determine the voltage across the temperature sensor 210. Based on the determined voltage across the temperature sensor 210, the input/output circuit 262 may determine the temperature associated with the cable 170.

In some examples, the input/output circuit 262 may determine the temperature associated with the cable 170 based on information stored in the registers 264 and/or other storage of the computing device 100. For example, the registers 264 may store a value or address that points to mapping information (e.g., a lookup table, a mapping table or other data structure) stored in the memory 150. The mapping information may map the determined voltage across the temperature sensor 210 to the temperature associated with the cable 170. For example, the mapping information may map a voltage of 1.0 V across the temperature sensor 210 to a temperature of 25° C. associated with the cable 170, and the mapping information may map a voltage of 1.5 V across the temperature sensor 210 to a temperature of 65° C. associated with the cable 170. As such, by accessing the registers 264 and/or other storage (e.g., the memory 150) of the computing device 100, the input/output circuit 262 may determine the temperature associated with the cable 170.

Upon determining the temperature associated with the cable 170, the input/output circuit 262 may then determine whether the temperature of the cable 170 exceeds a threshold temperature. In some examples, the threshold temperature may be a particular temperature, including but not limited to, 55° C., 60° C., 65° C., 70° C., 75° C., 80° C., 85° C., or more, or any value in between. In other examples, the threshold temperature may be other temperature between 55° C. to 85° C. or may correspond to different temperature ranges.

Responsive to determining that the temperature of the cable 170 exceeds the threshold temperature, the input/output circuit 262 may trigger a thermal protection operation to alert or prevent the cable 170 from melting.

In some examples, the thermal protection operation may include causing the power supply unit 140 to cease supplying power to the graphics card 120 by transmitting an overtemperature signal from the output terminal 276 to the power supply unit 140 through the second wire 208 and/or the fourth wire 204. For example, responsive to determining that the temperature of the cable 170 exceeds the threshold temperature, the input/output circuit 262 may drive a voltage of the gate of the NMOS 272 to a high voltage through the port 278. In some examples, the port 278 may be a general-purpose input/output (GPIO) pin of the input/output circuit 262.

Responsive to the voltage of the gate of the NMOS 272 being driven to the high voltage, the NMOS 272 may turn on to conduct current, which causes a voltage of the drain of the NMOS 272 connected to the output terminal 276 to be driven to a low voltage (e.g., approaching a ground voltage) because of the current flowing from the power supply VDD through the resistor 270 to a source of the NMOS 272, where the source may be connected to a ground.

By driving the output terminal 276 of the thermal protection controller 160 to a low voltage, a voltage of the second wire 208 may also be driven toward the low voltage through the fourth wire 204 that electrically connects the second wire 208 and the output terminal 276. Then, the power stability pin 244B of the power supply unit 140 may also be driven toward the low voltage because the power stability pin 244B is electrically connected with the output terminal 276 through the second wire 208 and the fourth wire 204.

Upon monitoring the power stability pin 244B be driven toward the low voltage, the power supply unit 140 may cease supplying power to the graphics card 120. It should be noted that, in other examples, the voltage of the output terminal 276, the fourth wire 204, the second wire 208 and the power stability pin 244B can be driven to other voltages to cause the power supply unit 140 to cease supplying power to the graphics card 120.

In some examples, the thermal protection operation may include causing the host controller 180 to trigger an output of an alert. The alert may be a message displayed through a display (not shown in FIG. 2) of the computing device 100. Alternatively, the alert may be a sound, light or other indicators that may notify a user about risk of thermal issues associated with the computing device 100.

More specifically, responsive to determining that the temperature associated with the cable 170 exceeds a threshold temperature, the input/output circuit 262 may transmit an alert signal to the host controller 180 through the communication link 280. The communication link 280 may be a part of a system bus or a control bus that may be embodied as a System Management Bus (SMBus), an Inter-Integrated Circuit (I2C), an Improved Inter-Integrated Circuit (I3C), a Universal Asynchronous Receiver/Transmitter (UART) or other communication links that can facilitate exchange of control signal between the thermal protection controller 160 and the host controller 180.

Responsive to receiving the alert signal, the host controller 180 may generate a system management interrupt (SMI) and may transmit the SMI to the system processor 110. Upon detecting the SMI, the system processor 110 may enter a system management mode (SMM) to execute handler code 154 that may be set up by the BIOS 130 during system boot-up to route an interrupt message to the operating system (OS) 156 of the computing device through an interface such as an Advanced Configuration and Power Interface (ACPI). The OS 156 may then cause an alert indicating melting to be notified (e.g., through a display or other components of the computing device 100 not shown in FIG. 2) to a user.

In some examples, the thermal protection operation may include causing the fan subsystem 212 to increase a fan speed (e.g., from 4000 rotations per minute (RPM) to 6000 RPM or higher) or a duty cycle of a fan of the computing device 100. For example, responsive to determining that the temperature associated with the cable 170 exceeds a threshold temperature, the thermal protection controller 160 may communicate with the fan subsystem 212 through the communication link 282 to cause the fan subsystem 212 to increase a fan speed or a duty cycle of one or more fans (e.g., a system fan or a processor fan) of the computing device 100. The communication link 282 may also be a part of a system bus or a control bus that facilitate communication between components of the computing device 100.

Example Melting Prevention Cable

Figure 3A:
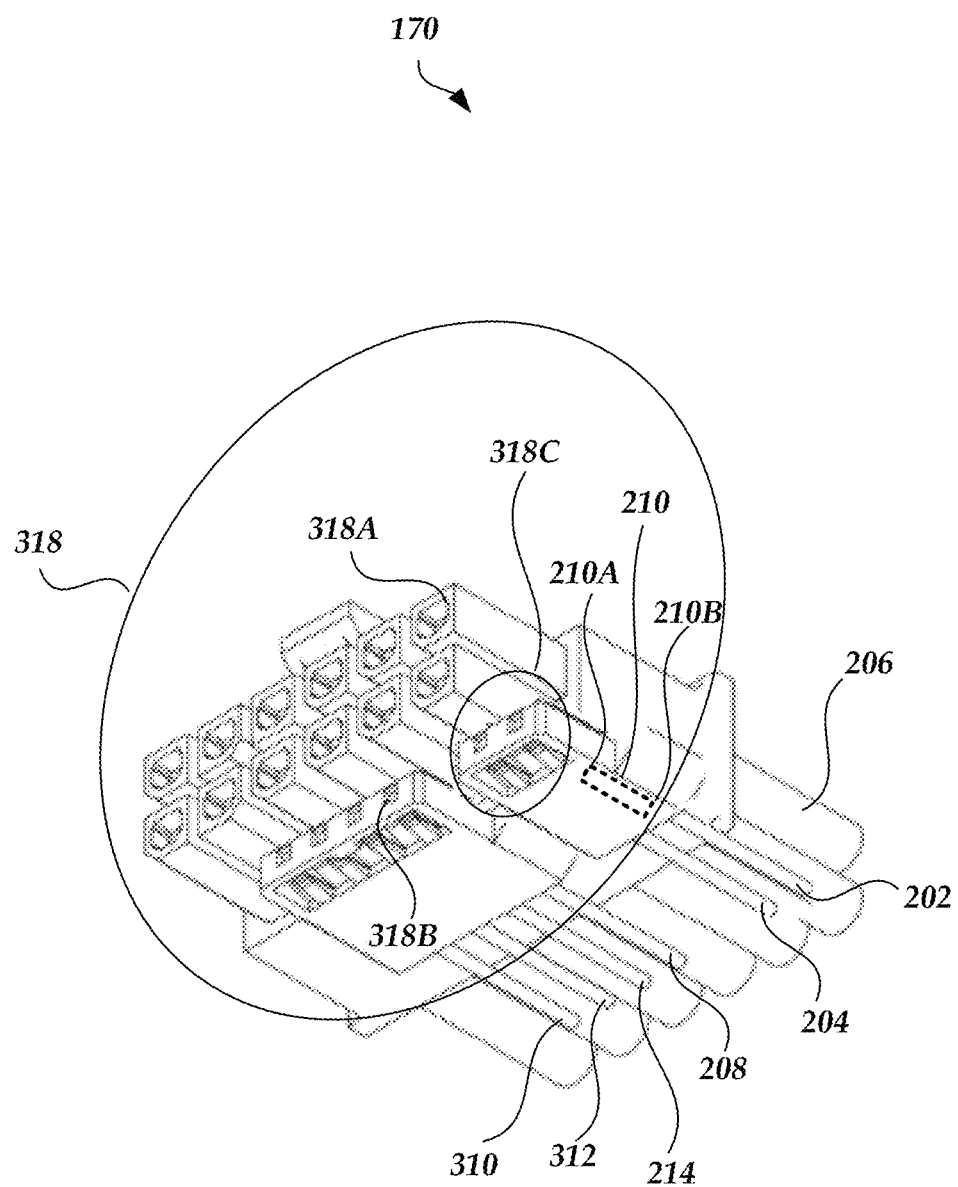
FIG. 3A illustrate a partial perspective view of a first example cable that may coordinate with other components of the computing device of FIG. 1 to alert or prevent the cable from melting in accordance with some examples of the present disclosure.

FIG. 3A illustrates a partial perspective view of a cable 170 that includes a cable connector 318, a first wire 206, a second wire 208, a third wire 202, a fourth wire 204, a temperature sensor 210 (hidden from view), a wire 310, a wire 312 and a wire 214 in accordance with some examples of the present disclosure. As described with respect to FIG. 1 and FIG. 2, the cable 170 may coordinate with the thermal protection controller 160 and other components of the computing device 100 to detect, alert or prevent melting associated with the cable 170.

In some examples, the cable connector 318 may allow the cable 170 to connect to the graphics card 120. For example, the cable connector 318A may connect one end of the first wire 206 of the cable 170 to a ground pin 222A of the graphics card 120, and the cable connector 318B may connect one end of the second wire 208 of the cable 170 to a power stability pin 222B of the graphics card 120.

As shown in FIG. 3A, the cable connector 318 may include multiple connectors (e.g., 318A and 318B) that allow one end of a wire (e.g., 206, 208, 310, 312, and 214) of the cable 170 to connect to pins of the graphics card 120, where the other end of the wire (e.g., 206, 208, 310, 312, and 214) of the cable 170 may connect to pins of the power supply unit 140. Additionally, the cable connector 318 may include the connector 318C that may not connect to pins of the graphics card 120.

In some examples, the graphics card 120 may be compatible with a 12VHPWR connector, and the cable connector 318 may include at least the connectors of the 12VHPWR. Additionally, the cable connector 318 may include a sub-connector or connector 318C. In some examples, the cable connector 318 may connect to some graphics card that is compatible with the 12VHPWR connector. It should be noted that the present disclosure is not limited to cables or graphics cards that support 12VHPWR, but may include cables and/or graphics cards that support other types of connectors.

Although not illustrated in FIG. 3A, in some examples, the other end of the first wire 206 may be connected to a ground pin 244A of the power supply unit 140, and the other end of the second wire 208 may be connected to a power stability pin 244B of the power supply unit 140. As such, the first wire 206 may electrically connect a ground pin 244A of the power supply unit 140 to a ground pin 222A of the graphics card 120, and the second wire 208 may electrically connect a power stability pin 244B of the power supply unit 140 to a power stability pin 222B of the graphics card 120.

As shown in FIG. 3A, the cable connector 318 may house a temperature sensor 210 that includes a first end 210A and a second end 210B. The temperature sensor 210 may be any component that may generate a sensor signal that is indicative of a temperature associated with the cable 170. For example, the temperature sensor 210 may be a thermal resistor, a thermistor or a temperature sensitive resistor, where a resistance of the temperature sensor 210 varies based on the temperature associated with the cable 170. In some examples, the first end 210A of the temperature sensor 210 may be electrically connected to the first wire 206. For example, the first end 210A of the temperature sensor 210 may be electrically connected to the first wire 206 through a first internal connection (not shown in FIG. 3) of the cable connector 318.

Additionally, the second end 210B of the temperature sensor 210 may be electrically connected to the third wire 202. As such, the third wire 202 may electrically connect the second end 210B of the temperature sensor 210 to the input terminal 274 of the thermal protection controller 160.

In some examples, one end of the fourth wire 204 may be shorted to the second wire 208 through a second internal connection (not shown in FIG. 3) of the cable connector 318. Further, the other end of the fourth wire 204 may electrically connect to the output terminal 276 of the thermal protection controller 160.

In some examples, a temperature associated with the cable 170 may be determined based on a voltage of the input terminal 274 of the thermal protection controller 160, where the input terminal 274 is electrically connected to the second end 210B of the temperature sensor 210 through the third wire 202 of the cable 170. Responsive to the temperature associated with the cable 170 being determined by the thermal protection controller 160 to exceed a threshold temperature, a voltage of the second wire 208 may be driven by the output terminal 276 and the fourth wire 204 from a first voltage (e.g., a high voltage) to a second voltage (e.g., a low voltage) to cause the power supply unit 140 to cease supplying power to the graphics card 120.

In some examples, the threshold temperature is sixty-five degrees Celsius or more. In other examples, the threshold temperature may be less than sixty-five degrees Celsius.

As illustrated in FIG. 3A, a temperature sensor 210 may be housed or embedded within the cable connector 318 for sensing temperature associated with the cable 170. In other examples not illustrated in FIG. 3A, instead of housing a temperature sensor within the cable connector 318, a temperature sensor may be deployed around and enclosing a wire of the cable 170. Specifically, a wire of the cable 170 may connect a ground pin 222A of the graphics card 120 and a ground pin 244A of the power supply unit 140. A temperature sensor may be deployed around and enclosing another wire of the cable 170 that is connected to the wire of the cable 170 on one end and connected to the thermal protection controller 160 on the other end. As such, the temperature sensed by the temperature sensor may be transmitted to the thermal protection controller 160 for determining the temperature associated with the cable 170.

Figure 3B:
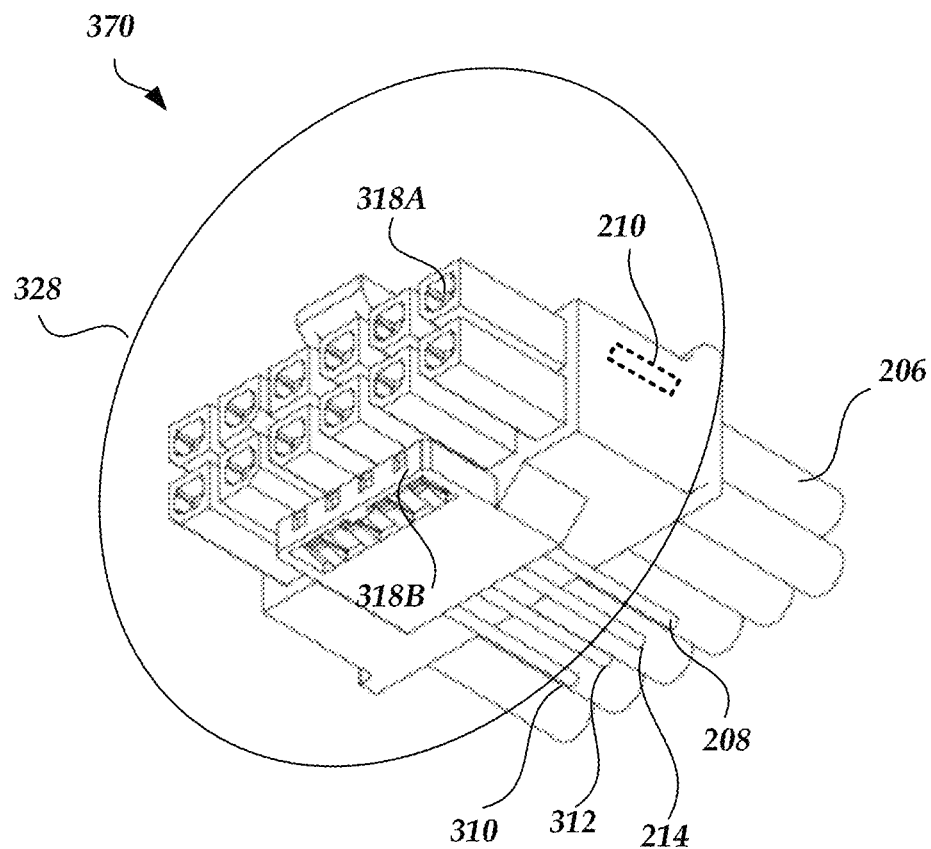
FIG. 3B-3C illustrate various partial perspective views of a second example cable that may coordinate with other components of the computing device of FIG. 1 to alert or prevent the cable from melting in accordance with some examples of the present disclosure.

FIG. 3B illustrates a partial perspective view of a cable 370 that shows a cable connector 328 that includes the connector 318A and the connector 318B, a first wire 206, a second wire 208, a temperature sensor 210 (hidden from view), a wire 310, a wire 312 and a wire 214 in accordance with some examples of the present disclosure. In some examples, the cable 370 may function the same or similar to the cable 170 and may be applicable to one or more embodiments described with respect to the cable 170.

Notably, the cable connector 328 of the cable 370 does not include the connector 318C of the cable 170 shown in FIG. 3A. As such, the cable 370 may connect to existing graphics cards (e.g., any graphics cards compatible with the 12VHPWR connector) without the need to change sockets of existing graphics cards. In contrast, some existing graphics cards may not be able to directly connect to the cable connector 318 because of the presence of connector 318C.

Figure 3C:
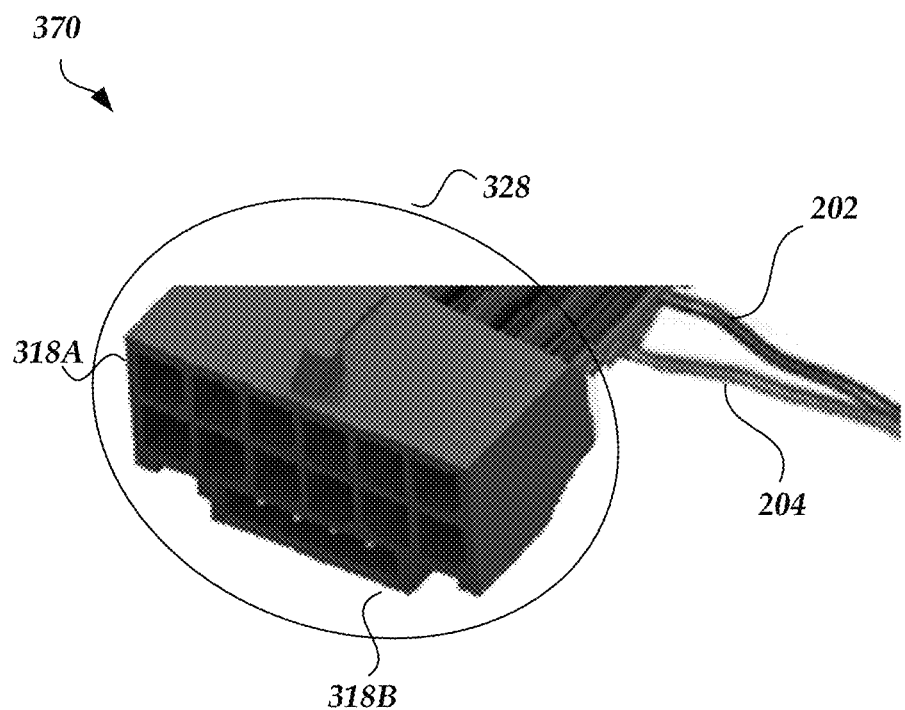

FIG. 3C illustrates another partial perspective view of the cable 370 that shows the cable connector 328 that includes the connector 318A and the connector 318B, a third wire 202, and a fourth wire 204. As illustrated in FIGS. 3B and 3C, in some embodiments, one end of the third wire 202 may connect to the first wire 206 through the temperature sensor 210 and an optional internal connection within the cable connector 328. The other end of the third wire 202 may connect to the input terminal 274 of the thermal protection controller 160. Additionally, one end of the fourth wire 204 may connect to the second wire 208 and the other end of the fourth wire 204 may connect to the output terminal 276 of the thermal protection controller 160.

Although not illustrated in FIGS. 3B-3C, in some embodiments, some of the wires 202, 204, 206, and 208 may share the same connector sheath. For example, both the second wire 208 and the fourth wire 204 may be deployed to fit into the connector 318B on one end to connect to the same pin (e.g., the power stability pin 222B) of the graphics card 120. In this example, the other end of the second wire 208 may connect to the power stability pin 244B of the power supply unit 140, and the other end of the fourth wire 204 may connect to the output terminal 276 of the thermal protection controller 160.

Example Melting Prevention Process

Figure 4:
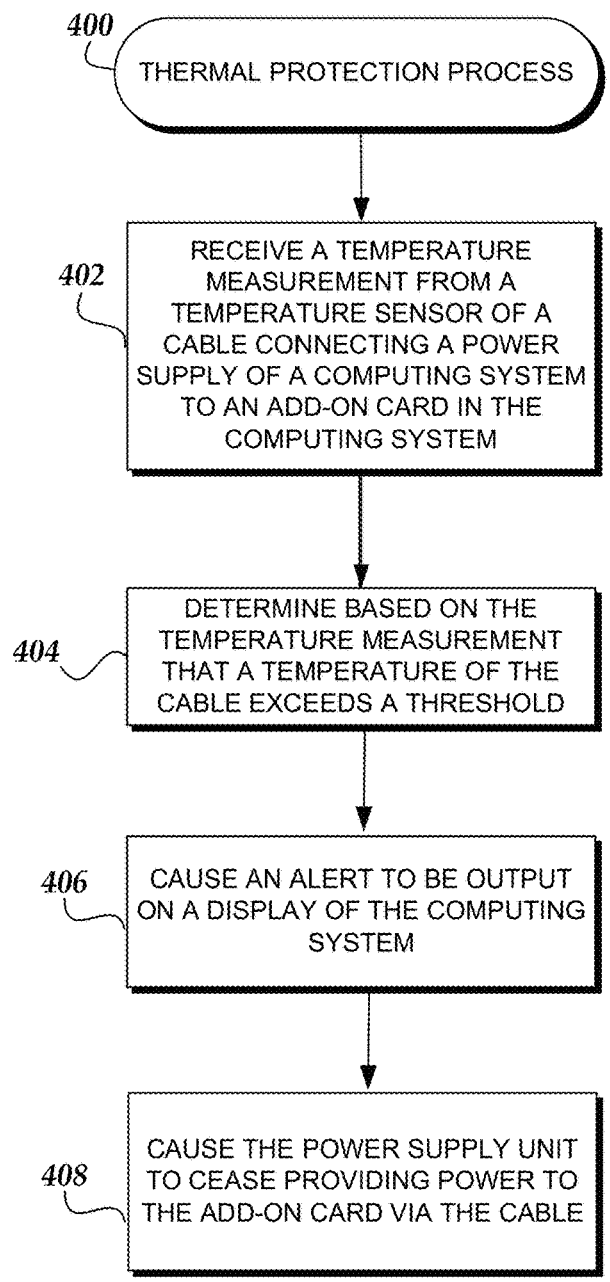
FIG. 4 depicts a flowchart of an example thermal protection process in accordance with some examples of the present disclosure.

With reference to FIG. 4, an illustrative process 400 for triggering a thermal protection operation to alert or prevent melting of a component of a computing device will be described. The process 400 may be implemented by any system that can detect a temperature associated with a component and that can trigger a thermal protection operation to prevent the component from melting in response to determining that the temperature associated with the component exceeds a temperature threshold. For example, the thermal protection process 400 can be implemented by at least one of the thermal protection controller 160, the cable 170, the host controller 180, and the like. To simplify discussion and not to limit the present disclosure, the process 400 will be described with respect to particular elements or systems.

The process begins at block 402, where a temperature measurement is received from a temperature sensor of a cable connecting a power supply of a computing system to a peripheral or an add-on card (e.g., a graphics card) in the computing system. For example, the thermal protection controller 160 may receive a temperature measurement from the temperature sensor 210 of the cable 170 that connects the power supply unit 140 and the graphics card 120 of the computing device 100. Specifically, the temperature measurement may be a sensor signal generated by the temperature sensor 210 of the cable 170, where the sensor signal may be indicative of a temperature associated with the cable 170. In some examples, the temperature sensor 210 may be a thermal resistor, and the temperature measurement may be a voltage across the thermal resistor. The thermal protection controller 160 may determine the voltage across the thermal resistor. Based at least in part on the voltage across the thermal resistor, the thermal protection controller 160 may determine the temperature associated with the cable 170. This temperature may be determined by accessing a lookup table or other data structure that associates voltage values for the thermal resistor with temperature values.

At block 404, the thermal protection controller 160 may determine, based on the temperature measurement, that a temperature of the cable 170 exceeds a threshold temperature. In some examples, the input/output circuit 262 may determine that the temperature of the cable 170 exceeds the threshold based on the temperature measurement from the temperature sensor 210.

At block 406, responsive to determining that the temperature of the cable 170 exceeds the threshold, the thermal protection controller 160 may cause an alert to be output on a display of the computing device 100. In some examples, the input/output circuit 262 of the thermal protection controller 160 may cause the alert to be output on a display of the computing device 100 through transmitting an alert signal to the host controller 180, which in turn may issue a system management interrupt (SMI) to trigger the operating system (OS) 156 to output the alert on the display of the computing device 100.

Optionally, responsive to determining that the temperature of the cable 170 exceeds the threshold, the thermal protection controller 160 may cause the fan subsystem 212 to increase a fan speed or a duty cycle of one or more fans of the computing device 100. In some examples, the thermal protection controller 160 may cause the fan subsystem 212 to increase a fan speed or a duty cycle of one or more fans concurrent or non-concurrent (e.g., at the same time, overlapping in time, before, or after) to causing the alert to be output on a display of the computing device 100.

For example, responsive to determining that the temperature of the cable 170 exceeds the threshold, the thermal protection controller 160 may increase a fan speed or a duty cycle of one or more fans of the computing device 100 before causing an alert to be output on a display of the computing device 100. Specifically, the thermal protection controller 160 may increase the fan speed or the duty cycle of a fan; and if the temperature of the cable 170 still exceeds the threshold after the fan speed or the duty cycle is increased for a first time period (e.g., one minute, five minutes or ten minutes), the thermal protection controller 160 may cause the alert to be output on a display of the computing device 100.

At block 408, a thermal protection controller may cause a power supply unit to cease providing power to the add-on card via a cable. For example, the thermal protection controller 160 may cause the power supply unit 140 to cease providing power to the graphics card 120 via the cable 170. Specifically, the thermal protection controller 160 may drive the output terminal 276 from a first voltage to a second voltage to cause a voltage of the second wire 208 and a voltage of the power stability pin 244B be driven to the second voltage, which in turn causes the power supply unit 140 to cease providing power to the graphics card 120.

In some examples, the thermal protection controller 160 may cause the power supply unit 140 to cease providing power to the graphics card 120 via the cable 170 after the alert at block 406 is outputted on a display of the computing device 100 for a second time period (e.g., five seconds, ten seconds or fifteen seconds).

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

Terminology

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Conditional language such as, among others, "can," "could." "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z." unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computing system comprising:
    a cable comprising:
        a first wire to electrically connect a ground pin of a power supply unit to a ground pin of a graphics card;
        a second wire to electrically connect a power stability pin of the power supply unit to a power stability pin of the graphics card; and
        a temperature sensor comprising a first end and a second end, wherein the first end of the temperature sensor is electrically connected to the first wire; and
    a thermal protection controller comprising an input terminal and an output terminal, wherein the input terminal is electrically connected to the second end of the temperature sensor, and wherein the output terminal is electrically connected to the second wire, the thermal protection controller to:
        determine, based on a voltage of the input terminal, that a temperature associated with the cable exceeds a threshold temperature; and
        responsive to determining that the temperature associated with the cable exceeds the threshold temperature, cause the power supply unit to cease supplying power to the graphics card.

2. The computing system of claim 1, wherein, responsive to determining that the temperature associated with the cable exceeds the threshold temperature, the thermal protection controller drives a voltage of the second wire through the output terminal from a first voltage to a second voltage to cause the power supply unit to cease supplying power to the graphics card.

3. The computing system of claim 1, wherein the cable further comprises a third wire, and wherein the input terminal is electrically connected to the second end of the temperature sensor through the third wire of the cable.

4. The computing system of claim 3, wherein the cable further comprises a fourth wire, and wherein the output terminal is electrically connected to the second wire through the fourth wire of the cable.

5. The computing system of claim 1, wherein the temperature sensor comprises a thermal resistor.

6. The computing system of claim 1, wherein, responsive to determining that the temperature associated with the cable exceeds the threshold temperature, the thermal protection controller is to cause an alert to be output.

7. A cable comprising:
    a first wire to electrically connect a ground pin of a power supply unit to a ground pin of a graphics card;
    a second wire to electrically connect a power stability pin of the power supply unit to a power stability pin of the graphics card;
    a cable connector to:
        connect the first wire to the ground pin of the graphics card;
        connect the second wire to the power stability pin of the graphics card; and
        house a temperature sensor;
    the temperature sensor comprising a first end and a second end, wherein the first end of the temperature sensor is electrically connected to the first wire;
    a third wire to electrically connect the second end of the temperature sensor to an input terminal of a thermal protection controller; and
    a fourth wire shorted to the second wire, the fourth wire to electrically connect to an output terminal of the thermal protection controller,
    wherein a temperature associated with the cable is determined based on a voltage of the input terminal that is electrically connected to the second end of the temperature sensor through the third wire, and wherein, responsive to the temperature associated with the cable being determined to exceed a threshold temperature, a voltage of the second wire is driven by the output terminal and the fourth wire from a first voltage to a second voltage to cause the power supply unit to cease supplying power to the graphics card.

8. The cable of claim 7, wherein the first end of the temperature sensor is electrically connected to the first wire through a first internal connection of the cable connector.

9. The cable of claim 8, wherein the fourth wire is shorted to the second wire through a second internal connection of the cable connector.

10. The cable of claim 7, wherein the temperature sensor comprises a thermal resistor.

11. The cable of claim 7, wherein the threshold temperature is sixty-five degrees Celsius or more.

12. A printed circuit assembly comprising:
    a host controller, the host controller communicatively connected with a thermal protection controller; and
    the thermal protection controller comprising a first terminal and a second terminal, wherein the first terminal is electrically connected to a first wire of a cable through a temperature sensor included in the cable, and wherein the second terminal is electrically connected to a second wire of the cable, the thermal protection controller to:
        receive, at the first terminal, a sensor signal from the temperature sensor;
        determine, based on the sensor signal, that a temperature associated with the cable exceeds a threshold temperature; and
        responsive to determining that the temperature associated with the cable exceeds the threshold temperature, trigger a thermal protection operation comprising causing a power supply unit to cease supplying power to a graphics card by transmitting an over-temperature signal from the second terminal to the power supply unit through the second wire of the cable.

13. The printed circuit assembly of claim 12, further comprising a fan subsystem communicatively connected with the thermal protection controller, wherein the thermal protection operation comprises causing the fan subsystem to increase a fan speed or a duty cycle of a fan.

14. The printed circuit assembly of claim 12, wherein the thermal protection operation comprises causing the host controller to trigger an output of an alert.

15. The printed circuit assembly of claim 12, wherein the first wire electrically connects a ground pin of the power supply unit to a ground pin of the graphics card, and wherein the second wire electrically connects a power stability pin of the power supply unit to a power stability pin of the graphics card.

16. The printed circuit assembly of claim 12, wherein a first end of the temperature sensor is electrically connected to the first wire of the cable, and wherein a second end of the temperature sensor is electrically connected to the first terminal.

17. The printed circuit assembly of claim 16, wherein the temperature sensor is a thermal resistor, and wherein the sensor signal is a voltage across the thermal resistor.

18. The printed circuit assembly of claim 17, wherein, to determine that the temperature associated with the cable exceeds the threshold temperature, the thermal protection controller is to:
   determine the voltage across the thermal resistor; and
   determine the temperature associated with the cable based at least in part on the voltage across the thermal resistor.

19. The printed circuit assembly of claim 16, wherein the second end of the temperature sensor is electrically connected to the first terminal through a third wire of the cable.

20. The printed circuit assembly of claim 12, wherein the second terminal is electrically connected to the second wire of the cable through a fourth wire of the cable.

\* \* \* \* \*